United States Patent [19]

Desiderio et al.

[11] 3,898,298

[45] Aug. 5, 1975

[54] SELECTIVE HYDROGENATION OF VINYL ACETYLENE

[75] Inventors: Richard J. Desiderio, Lansdowne; Alan R. Hirsig, Willingford, both of Pa.; Donald G. Miller, Houston, Tex.

[73] Assignee: Atlantic Richfield Company, Philadelphia, Pa.

[22] Filed: Apr. 13, 1973

[21] Appl. No.: 351,074

[52] U.S. Cl. .......................................... 260/681.5
[51] Int. Cl. .............................................. C07c 7/00
[58] Field of Search ................................ 260/681.5

[56] References Cited
UNITED STATES PATENTS 3,342,891  9/1967  Poons et al. ................. 260/681.5 R

*Primary Examiner*—Veronica O'Keefe
*Attorney, Agent, or Firm*—John R. Ewbank

[57] ABSTRACT

A butadiene stream containing vinyl acetylene contaminant is hydrogenated to convert most of vinyl acetylene with relatively small conversion of butadiene, using palladium on alumina catalysts at around 35°C., outstanding selectivity being achieved by controlling the pressure near 7 atmospheres to achieve mixed phase operation.

1 Claim, No Drawings

SELECTIVE HYDROGENATION OF VINYL ACETYLENE

BACKGROUND OF THE INVENTION

1. Field of the Invention

This invention relates to hydrogenation of acetylene contaminants in a stream of diolefins and particularly to hydrogenation of vinyl acetylene selectively in the presence of predominant amounts of butadiene.

2. Prior Art

The usefulness of butadiene is significantly impaired unless the vinyl acetylene contaminant concentration is reduced to a level tolerable for the contemplated end use. Since the discovery of analytical procedures for the detection of minor amounts of vinyl acetylene in butadiene, it has been known that most methods for producing butadiene produce crude butadiene streams containing vinyl acetylene as a contaminant. For several decades, various procedures for hydrogenation of vinyl acetylene in a crude butadiene stream have been employed industrially for purifying the butadiene stream. Because the unit ratio of selectivity has been less than infinite, some butadiene has been hydrogenated to butene, creating a loss of butadiene. Many tons of valuable butadiene product have been lost in converting vinyl acetylene during the necessary step of deacetylenization. These continuing losses have stimulated more research on the hydrogenation of the vinyl acetylene contaminant in a butadiene stream than on many other commercially practiced hydrogenation methods. Because of the continuing financial incentive, substantially all of the permutations and combinations deemed plausible by routineering investigators have had been evaluated and reported. However, the long-sought goal of an inexpensive method for hydrogenating vinyl acetylene in a butadiene stream has not been achieved.

SUMMARY OF THE INVENTION

In accordance with the present invention, a stream of crude butadiene containing contaminant amounts of vinyl acetylene and other acetylenic compounds is hydrogenated in the presence of a catalyst consisting of a sorptive alumina support and a minor amount palladium at a temperature of near 45°C. and within a range from about 20° to about 70°C. for achieving a very high degree of selectivity for acetylenic hydrogenation. The advantageous results are attributable to the control of the pressure for achieving mixed-phase reaction condition at a pressure of about 7 atmospheres and within the range from about 6 to 11 atmospheres. The vinyl acetylene concentration of the effluent is not more than 30 per cent of the vinyl acetylene concentration in the feed because the vinyl acetylene conversion is at least 70 per cent. The unit mol ratio of selectivity in the last reactor (if a plurality of reaction zones are employed) is at least 80 and at least 50 per cent greater than at conditions generally the same except for liquid phase operation at a pressure of about 20 atmospheres. Such a large unit mol ratio of selectivity and selectivity improvement are surprising results for lowering the pressure to achieve mixed phase operation.

The nature of the invention is further clarified by reference to an example.

EXAMPLE 1

A stream of liquid butadiene was processed to decrease the concentration of vinyl acetylene and other acetylenic components by selective hydrogenation over a supported palladium catalyst. The hydrocarbon stream was mixed with a controlled amount of hydrogen to maintain the desired hydrogen to acetylene ratio and passed through a first catalyst bed, and the effluent was cooled in a heat exchanger, mixed with additional hydrogen, passed through a second catalyst bed, and the liquid effluent was purified product suitable for use in a butadiene plant as a deacetylenated stream. Liquid flow rates were maintained at about 4.5 m³/hr. The hydrogen to acetylene unit mol ratio was about 1 in the first reactor and about 4.58 in the second reactor. The average temperature in each reactor was near 47°C.

The catalyst consists of sorptive alumina containing 0.1 per cent palladium and is a catalyst of the type commercially employed in reactions benefiting from such supported palladium catalysts.

The composition of the feedstock was

| | |
|---|---|
| 1,3 butadiene | 68.10% |
| ethyl acetylene | 0.27% |
| vinyl acetylene | 0.84% |
| butenes | 30.79% |

Analyses were reported as percentage by weight, but in such a feedstock mol percentages are substantially the same. Said feedstock was hydrogenated to prepare two samples of deacetylenated butadiene, Example 1 being an embodiment of the invention and the control being at substantially the same conditions except as to pressure.

In the control operation, the pressure was maintained at 20.4 atmospheres, whereby liquid phase conditions were maintained in the reaction zones, and in the method of the present invention, the pressure was maintained at 7.8 atmospheres, whereby mixed phase conditions prevailed in the catalyst bed. It was noted that in the temperature reange at which deacetylenated butadiene is prepared, the mixed hydrocarbons were in the liquid state at 20.4 atmospheres, but were in mixed phase at pressures in a range from about 6 to about 11 atmospheres.

Data relating to the control and Example 1 of the invention are shown in Table 1.

TABLE 1

| | Control | Example 1 |
|---|---|---|
| Significant variable | | |
| Pressure, atm. | 20.4 | 7.8 |
| Phase | liquid | mixed |
| Process Conditions | | |
| First Reactor: | | |
| inlet °C. | 42 | 41 |
| outlet °C. | 52 | 52 |
| average °C. | 47 | 47 |
| Interstage composition | | |
| butadiene | 67.80 | 68.10 |
| ethyl acetylene | 0.14 | 0.24 |
| vinyl acetylene | 0.39 | 0.50 |
| butenes | 31.67 | 31.18 |
| Unit ratio of selectivity | 70.0 | 105.3 |
| % improvement in unit ratio | base | 51.0 |
| VA % conv. | 53.6 | 40.5 |
| Second Reactor: | | |
| inlet °C. | 30 | 30 |
| outlet °C. | 68 | 60 |
| average °C. | 49 | 45 |
| Effluent composition | | |
| butadiene | 65.80 | 67.10 |
| ethyl acetylene | 0.07 | 0.09 |
| vinyl acetylene | 0.07 | 0.06 |
| butenes | 34.06 | 32.75 |

TABLE 1-Continued

| | | |
|---|---|---|
| Unit ratio of selectivity | 50.6 | 102.0 |
| % improvement in unit ratio | base | 102.0 |
| VA % conv. | 82.0 | 88.0 |
| Overall VA % conv. | 91.6 | 92.9 |

The unit ratio of selectivity of the acetylenic hydrogenation is herein defined as the ratio of the first order rate constants for the acetylenic hydrogenation to the butadiene hydrogenation. At a conversion of about 92 per cent of the vinyl acetylene, there was a loss of 3.0 kilograms of butadiene per kilogram of conversion of vinyl acetylene in the control. By the present invention, however, there was a loss of only 1.28 kilogram of butadiene per kilogram of conversion of vinyl acetylene at the same 92 per cent conversion. The control thus involved losses which were 236 per cent of the losses by the present invention. It is surprising that such a large improvement was attainable in the process by shifting from liquid phase to mixed phase operation, inasmuch as mixed phase conditions are generally disadvantageous for supported noble metal catalysts.

By a series of tests it is established that the feedstock must contain a principal amount of butadiene, a contaminant amount of vinyl acetylene (such amount being formed as a by-product of manufacture of butadiene) and lesser amounts of other acetylenes. The catalyst must consist predominantly of sorptive alumina with a minor amount of palladium. The hydrogenation of the feedstock must be conducted at a temperature within the range from about 20°C. to about 70°C. with interstage cooling and/or other heat exchange to avoid excessive temperatures. The hydrogen to vinyl acetylene unit mol ratio should initially be low in order to minimize initial temperature increase and should be not more than about 5 in the feed to the last reactor. It is important to achieve an overall conversion of at least 70 per cent of the vinyl acetylene so that the vinyl acetylene content of the product is less than 30 per cent of the vinyl acetylene content of the feedstock. In the last reactor, the unit ratio of selectivity of the method of the present invention is at least 50 per cent greater than the selectivity at generally comparable conditions other than liquid phase hydrogenation at a pressure of 20 atmospheres. Such unit ratio of selectivity in the last reactor is at least 80 at a vinyl acetylene conversion greater than 70 per cent. Moreover, such liquid phase 20 atmosphere operation involves an overall loss of butadiene (e.g., measured in kilograms or other weight units) which is at least 50 per cent more than the loss of butadiene by the present invention for each kilogram (or corresponding weight unit) of vinyl acetylene converted by the selective hydrogenation. It is surprising that such outstanding superiority of performance has been achieved for a type of reaction which has been described generally and employed industrially for many years. Prior art hydrogenative deacetylenic methods for treating crude butadiene have generally been conducted at pressures within a range from about 19 to 50 atmospheres for maintaining liquid phase conditions.

In preferred embodiments of the invention, the feedstock contains from about 0.7 to about 1.0 per cent vinyl acetylene, the catalyst contains from about 0.05 to about 0.2 per cent palladium, the flow rate is within a range from about 2 to 8 m³ of liquid per hour, the catalyst is in two beds with interstage cooling of the reactant stream and interstage addition of hydrogen, the average temperature in each catalyst bed is within a range from about 40°C. to about 60°C., the overall conversion of vinyl acetylene is greater than 90 per cent and the pressure is about 8 atmospheres.

We claim:
1. In the method in which a composition containing a principal amount of butadiene, a contaminant amount of vinyl acetylene, such amount being formed as a by-product of manufacture of crude butadiene and lesser amounts of other acetylenes is treated with hydrogen in the presence of a catalyst to produce a product containing significantly less vinyl acetylene, the improvement which consists of:

using a feedstock containing about 0.7 to about 1.0 per cent vinyl acetylene, and conducting the hydrogenation at mixed phase conditions comprising both liquid phase and vapor phase conditions, such mixed phase featuring a pressure of about seven atmospheres and within the range from about six to about eleven atmospheres and such mixed phase featuring an average temperature in each of two catalyst beds within the range from about 40°C. to about 60°C., whereby the unit ratio of selectivity of vinyl acetylene conversion to butadiene conversion is greater than 80 at a vinyl acetylene conversion greater than 70 per cent, such selectivity ratio being more than 50 per cent better than at comparable conditions other than liquid phase operation at a pressure of about 20 atmospheres, said hydrogenation being conducted in contact with a catalyst consisting essentially of sorptive alumina and from 0.05 to 0.2 per cent palladium, the catalyst being distributed in two beds with interstage cooling and interstage hydrogen injection, the hydrogen to vinyl acetylene ratio being about 1 in the first reactor and being not more than about five in the second reactor, whereby the loss of butadiene is only about 1.28 kilogram of butadiene per kilogram of conversion of vinyl acetylene.

* * * * *